(12) United States Patent
Lim et al.

(10) Patent No.: US 10,237,023 B2
(45) Date of Patent: Mar. 19, 2019

(54) HYBRID AUTOMATIC REPEAT REQUEST METHOD AND APPARATUS IN RELAY WIRELESS COMMUNICATION SYSTEM USING COMPRESSED-AND-FORWARD SCHEME

(71) Applicant: Samsung Electronics Co., Ltd., Gyeonggi-do (KR)

(72) Inventors: Jongbu Lim, Yongin-si (KR); Sungho Chae, Seoul (KR); Sunghoon Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 15/324,633

(22) PCT Filed: Aug. 13, 2015

(86) PCT No.: PCT/KR2015/008501
§ 371 (c)(1),
(2) Date: Jan. 6, 2017

(87) PCT Pub. No.: WO2016/024833
PCT Pub. Date: Feb. 18, 2016

(65) Prior Publication Data
US 2017/0244521 A1   Aug. 24, 2017

(30) Foreign Application Priority Data

Aug. 13, 2014  (KR) .................. 10-2014-0104987

(51) Int. Cl.
*H04J 1/10*  (2006.01)
*H04L 1/18*  (2006.01)
(Continued)

(52) U.S. Cl.
CPC .......... *H04L 1/1819* (2013.01); *H04L 1/0076* (2013.01); *H04L 1/1845* (2013.01); *H04L 2001/0097* (2013.01); *H04W 84/042* (2013.01)

(58) Field of Classification Search
CPC .... H04L 1/1819; H04L 1/0076; H04L 1/1845
(Continued)

(56) References Cited

U.S. PATENT DOCUMENTS

| | | | |
|---|---|---|---|
| 5,285,276 A * | 2/1994 | Citta ................. | H04N 5/4401 348/469 |
| 9,130,749 B1 * | 9/2015 | Song ..................... | H04L 1/08 |

(Continued)

FOREIGN PATENT DOCUMENTS

| | | |
|---|---|---|
| JP | 2014-501059 A | 1/2014 |
| KR | 10-2010-0009185 A | 1/2010 |

(Continued)

*Primary Examiner* — Thai D Hoang

(57) ABSTRACT

The present disclosure relates to a 5G or pre-5G communication system which will be provided in order to support a higher data transmission rate than in 4G communication systems such as LTE. A method at a relay node according to one example of the present invention is a hybrid automatic repeat request method at the relay node in a relay wireless communication system using a compress-and-forward (CF) scheme, and may comprise the steps of: when receiving data from a previous node, performing mesh quantization so as to have redundant information at the time of quantization for transmitting, to a next node, the data received from the previous node; transmitting to the next node by channel-coding only an amount transmittable to a channel set for transmitting to the next node from upper information among the quantized information; and when receiving negative acknowledgement (NACK) from the next node, retransmitting to the next node by channel-coding only an amount transmittable to the set channel among the other information which is not transmitted among the quantized information.

8 Claims, 16 Drawing Sheets

(51) Int. Cl.
*H04L 1/00* (2006.01)
*H04W 84/04* (2009.01)

(58) Field of Classification Search
USPC .......... 370/315–330, 335–344; 375/242–253
See application file for complete search history.

(56) References Cited

U.S. PATENT DOCUMENTS

| | | | |
|---|---|---|---|
| 2006/0170571 | A1* | 8/2006 | Martinian ............... H03M 7/30 341/50 |
| 2006/0251079 | A1* | 11/2006 | Kwak ................... H04L 1/1642 370/394 |
| 2008/0031177 | A1 | 2/2008 | Lee et al. |
| 2008/0144952 | A1* | 6/2008 | Chen ...................... H04N 19/12 382/239 |
| 2009/0172683 | A1* | 7/2009 | Lin ........................ G06F 9/505 718/103 |
| 2009/0245284 | A1* | 10/2009 | Xu ....................... H04L 1/0028 370/474 |
| 2010/0012418 | A1 | 1/2010 | Yoshizawa |
| 2010/0091902 | A1* | 4/2010 | Park ..................... H04L 1/1893 375/295 |
| 2010/0211842 | A1* | 8/2010 | Moon ................... H04L 1/1819 714/748 |
| 2013/0223326 | A1 | 8/2013 | Yu et al. |
| 2013/0329573 | A1 | 12/2013 | Chen |

FOREIGN PATENT DOCUMENTS

| | | |
|---|---|---|
| KR | 10-2010-0054735 A | 5/2010 |
| KR | 10-1316622 B1 | 11/2013 |
| KR | 10-2014-0062530 A | 5/2014 |

\* cited by examiner

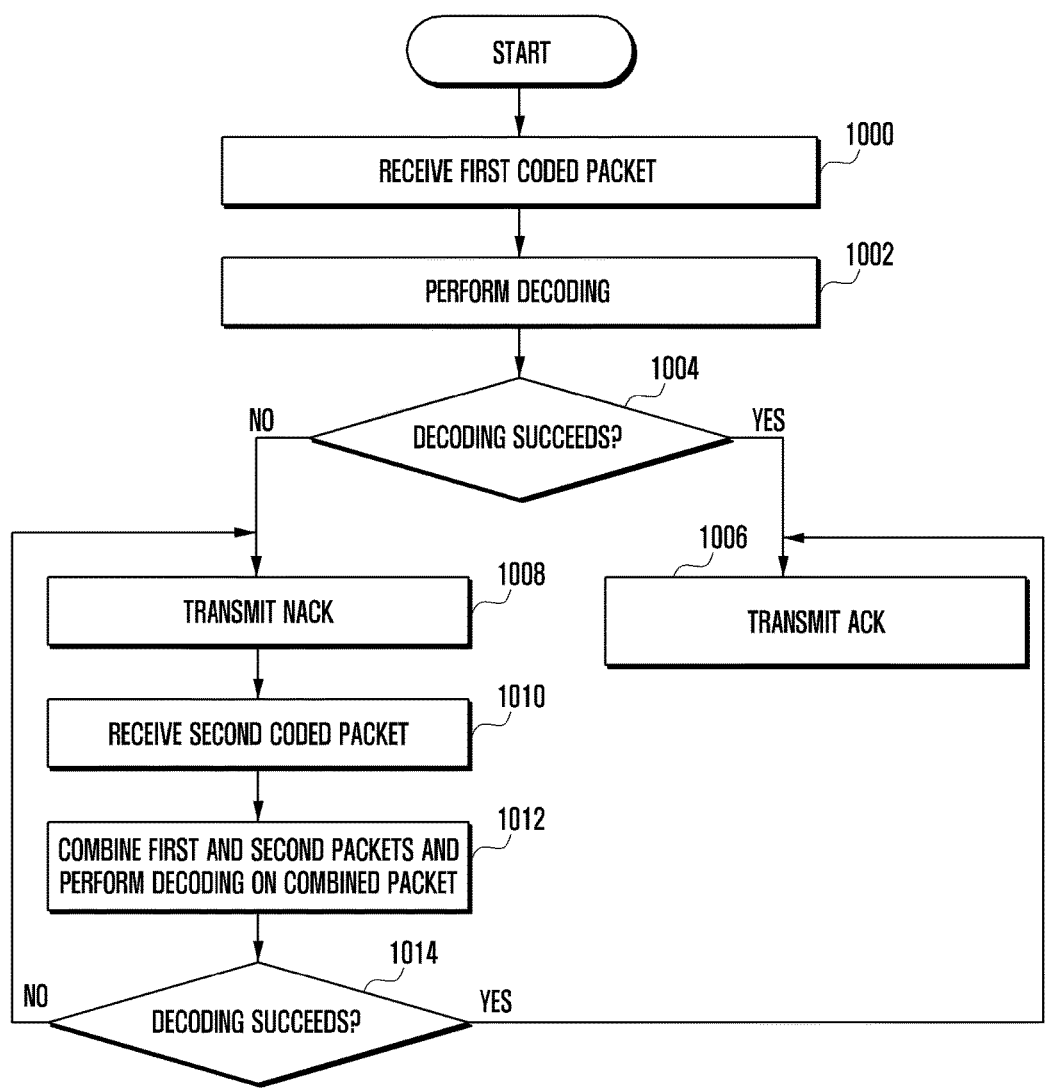

HYBRID AUTOMATIC REPEAT REQUEST METHOD AND APPARATUS IN RELAY WIRELESS COMMUNICATION SYSTEM USING COMPRESSED-AND-FORWARD SCHEME

CROSS-REFERENCE TO RELATED APPLICATION(S)

The present application claims priority under 35 U.S.C. § 365 to International Patent Application No. PCT/KR2015/008501 filed Aug. 13, 2015, entitled "HYBRID AUTOMATIC REPEAT REQUEST METHOD AND APPARATUS IN RELAY WIRELESS COMMUNICATION SYSTEM USING COMPRESSED-AND-FORWARD SCHEME", and claims a priority to Korean Patent Application No. 10-2014-0104987 filed on Aug. 13, 2014, which are incorporated herein by reference into the present disclosure as if fully set forth herein.

TECHNICAL FIELD

The present invention relates to a Hybrid Automatic Repeat Request method and apparatus for use in a relay wireless communication system and, in particular, to a Hybrid Automatic Repeat Request method and apparatus for use in a relay wireless communication system using Compress-and-Forward (CF) scheme.

BACKGROUND ART

In order to meet the increasing demand for wireless data traffic since the commercialization of 4G communication systems, the development focus has been on the $5^{th}$ Generation (5G) or pre-5G communication system. For this reason, the 5G or pre-5G communication system is called beyond 4G network communication system or post Long Term Evolution (LTE) system.

In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna.

Also, for throughput enhancement of the 5G communication system, research is being conducted on various techniques such as small cell, advanced small cell, cloud radio access network (cloud RAN), ultra-dense network, Device to Device Communication (D2D), wireless backhaul, moving network, cooperative communication, Coordinated Multi-Points (CoMP), and interference cancellation.

Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

A relay wireless communication system is characterized in that a source device transmits data to a destination device via a relay device. In the relay wireless communication system, the data transmitted by the source device is relayed by at least one relay device to the destination device. At this time, the relay device processes the data received from the source device and relays the processed data, instead of the received data, to the destination device. The relay device may use one of 3 operation schemes.

The first operation scheme is an Amplify-and-Forward (AF), the second operation scheme is a Decode-and-Forward (DF), and the third operation scheme is a Compressed-and-Forward (CF) scheme.

The AF scheme is characterized in that the data received from a previous node is just amplified and relayed to the next node to deliver the data from the source device to the destination device. This is the most basic method for protecting against decoding failure on the data transmitted from the source device to the destination device.

The DF scheme is characterized in that the relay device decodes and then encodes the data received from a previous node and transmits the newly encoded data. In the case of using the DF scheme, each relay device has to perform decoding and encoding operations every time such data is received. Since the relay device transmits the re-encoded data at a power level equal to or greater than a minimum transmission power, the data can be delivered securely from the source device to the destination device.

The CF scheme is characterized in that the data received from a previous node is compressed for delivery. At this time, the compression is achieved by quantization. Accordingly, the relay device decodes the quantized data and then performs quantization for transmission to the next node. In the CF scheme, each relay device also has to decode the quantized data and quantize the decoded data for transmission such that the data is transmitted at a power level equal to or greater than a minimum transmission power, resulting in secure delivery from the source device to the destination device.

In the above-described schemes, a Hybrid Automatic Repeat Request (HARQ) technique is used to correct errors in the transmitted data. There are two methods for applying HARQ to a DF scheme-based relay protocol as follows.

The first method is to use an end-to-end HARQ, and the second method is to use independent HARQ per node. In the following description, the device which transmits data is referred to as "source", the device for which the data is destined is referred to as "destination", and the devices which relay the data from the source to the destination are referred to as "relays".

In the case of using the end-to-end HARQ, the destination decodes the data received from the source via relays and determines whether any packet error is detected. Depending on whether any packet error is detected, the destination may transmit an ACK/NACK to the source via the relays. The source transmits a new packet upon receipt of the ACK or performs retransmission upon receipt of the NACK.

A description is hereinafter made of the method of using the independent HARQ per node. If a packet is received from the source, the relay decodes the packet to determine whether any error is detected. If the packet is decoded successfully, the relay transmits an ACK to the source and forwards the successfully decoded data to the next node, e.g., another relay or destination. In this case, the source may transmit a new packet. However, if it fails to decode the packet, the relay transmits a NACK to the source to request for retransmission.

In the case of using the above-described CF scheme, it is necessary to apply the end-to-end HARQ technique for the relay network or perform HARQ for correcting errors caused by channel uncertainty of the relay-destination link. In this case, the information signaling and data retransmission should be performed through multi-hop links between the source and destination, resulting in an increase of HARQ processing time delay.

DISCLOSURE OF INVENTION

Technical Problem

The present invention provides an HARQ method for reducing delay in a relay wireless communication system utilizing the CF scheme and an apparatus therefor.

Solution to Problem

In accordance with an aspect of the present invention, a hybrid automatic repeat request retransmission method of a relay node in a wireless communication system using a compress-and-forward (CF) scheme includes quantizing, when data is received from a previous node, the data to have redundant information using a nested quantization technique before being transmitted to a next node; transmitting a most significant part of the quantized information to the next node through a preconfigured channel, the most significant part being channel-coded to have an amount suitable for the channel; and transmitting, when a negative acknowledgement (NACK) is received from the next node, a next significant part of the quantized information to the next node, the next significant part being channel coded to have an amount suitable for the channel.

In accordance with another aspect of the present invention, a hybrid automatic repeat request retransmission method of a destination node in a wireless communication system using a compress-and-forward (CF) scheme includes storing and decoding, when a first coded packet is received from a relay node, the first coded packet; transmitting, when decoding the first coded packet fails, a negative acknowledgement (NACK) to the relay node; decoding, when a second coded packet is received from the relay node, a combined packet acquired by combining the first and second coded packets; and transmitting to the relay node an acknowledgement/negative-acknowledgement (ACK/NACK), wherein the first and second coded packets carry data quantized by the relay node to have redundant information using a nested quantization scheme, the first coded packet carries a most significant part of the quantized information as much as an amount suitable for the channel, and the second coded packet carries a next significant part of the quantized information as much as an amount suitable for the channel.

In accordance with another aspect of the present invention, a relay node device for performing a hybrid automatic repeat request in a wireless communication system using a compress-and-forward (CF) scheme includes a data reception unit which converts data received from a previous node to a baseband analog signal, receives an acknowledgement (ACK/NACK) from a next node, and transfers the acknowledgement to a control unit; a quantization unit which performs nested quantization on the baseband analog signal to have redundant information for transmission to the next node; a storage unit which stores the quantized data; a control unit which controls outputting the quantized data stored in the storage unit as much as an amount suitable for a preconfigured channel, transmitting a most significant part of the quantized information for initial transmission, and retransmitting a non-transmitted part of the quantized data; a channel coding unit which performs channel coding on the data output from the storage unit; and a data transmission unit which transmits data channel-coded by the channel coding unit through a preconfigured channel.

In accordance with still another aspect of the present invention, a destination node device for performing a hybrid automatic repeat request in a wireless communication system using a compress-and-forward (CF) scheme includes a data reception unit which receives a coded packet from a relay node and converts the coded packet to a baseband analog signal; a channel decoding unit which performs channel-decoding on the baseband signal; a decoded data storage unit which stores output from the channel decoding unit; a combining unit which combines the data output from the channel decoding unit and the decoded data storage unit; a decoding success determination unit which determines whether an input signal is decoded successfully; a switch which switches between outputs of the channel decoding unit and the combining unit to the decoding success determination unit; an acknowledgement transmission unit which transmits an acknowledgement (ACK/NACK) to the relay node according to the decoding result; and a control unit which controls to switch the output of the channel decoding unit to one of the decoded data storage unit and the combining unit, controls reset and data output of the decoded data storage unit, controls the combining unit to combine first and second channel-decoded data, controls a switching operation of the switch, and controls the acknowledgement signal transmission unit to generate an acknowledgement according to whether the decoding succeeds, wherein the coded packet received from the relay node is data quantized to have redundant information through nested quantization, the coded packet being transmitted initially carries a most significant part of the quantized information as much as an amount suitable for the channel, and the coded packet being retransmitted carries residual part of the quantized information as much as an amount suitable for the channel.

Advantageous Effects of Invention

The method of the present invention is advantageous in terms of reducing HARQ processing delay between the relay node and the destination node. Also, the method of the present invention is advantageous in terms of reducing the transmission delay by not performing the end-to-end HARQ.

BRIEF DESCRIPTION OF DRAWINGS

FIG. 10 is a flowchart illustrating an HARQ operation of a destination node in a relay wireless communication system using a CF scheme according to an embodiment of the present invention.

MODE FOR THE INVENTION

Exemplary embodiments of the present invention are described in detail with reference to the accompanying drawings. The same reference numbers are used throughout the drawings to refer to the same or like parts. The drawings are provided to help understanding the present invention, but they are not intended to be limiting for the present invention in shape and arrangement. Detailed descriptions of well-known functions and structures incorporated herein may be omitted to avoid obscuring the subject matter of the present invention. In the following, descriptions are made of only the parts necessary for understanding the operations in accordance with various embodiments of the present invention and not of the other parts to avoid obscuring the subject matter of the present invention.

Figure 1:
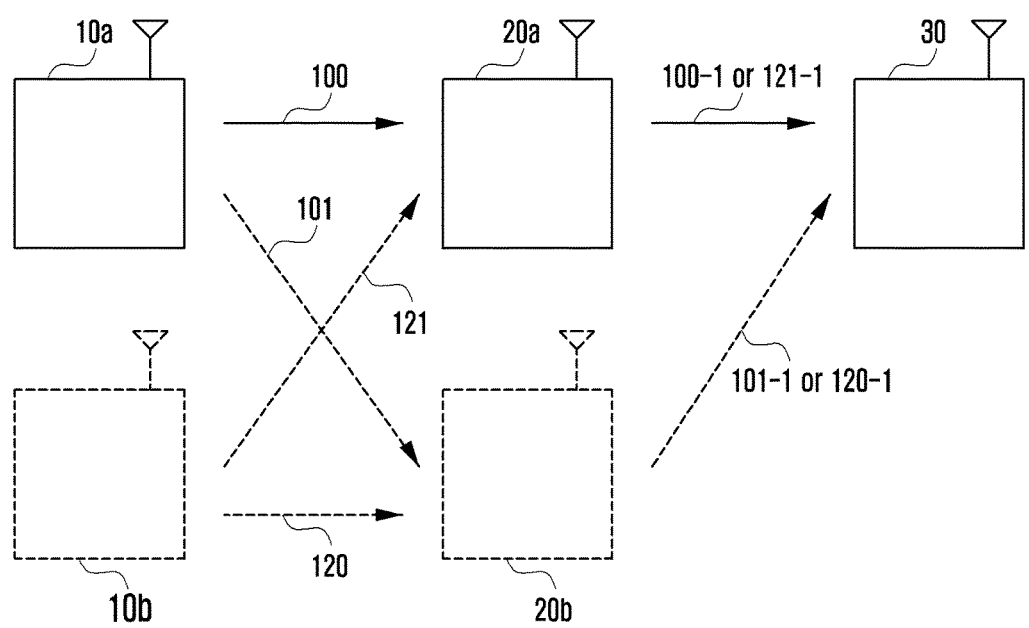
FIG. 1 is a schematic diagram illustrating a wireless communication system with relays.

FIG. 1 is a schematic diagram illustrating a wireless communication system with relays.

In reference to FIG. 1, the wireless communication system includes source nodes 10a and 10b, relay nodes 20a and 20b, and a destination node 30.

The first source node 10a may transmit data to the destination node 30 via one or both of the relay nodes 20a and 20b. In detail, in the case that the source node 10a transmits data to the destination node 30 via the first relay node 20a, the data is delivered through a path comprised of channels 100 and 100-1. In the case that the first source node 10a transmits data to the destination node 30 via the second relay node 20b, the data is delivered through a path comprised of channels 101 and 101-1.

Also, second source node 10b may transmit data to the destination node 30 via one or both of the two relay nodes 20a and 20b. In detail, in the case that the second source node 10b transmits data to the destination node 30 via the first relay node 20a, the data is delivered through a path comprised of channels 121 and 121-1. In the case that the second source node 20a transmits data to the destination node 30 via the second relay node 20b, the data is delivered through a path comprised of channels 120 and 120-1.

The above description has been made to show various exemplary situations that are likely to occur in a relay system. In the following description, the source nodes are denoted by a representative numeral of 10 and the relay nodes are denoted by a representative numeral of 20 for convenience of explanation. Also, it is assumed for convenience of explanation that there is one source node and one relay node in the system. Such an assumption is made only for convenience of explanation, and the data may be relayed via two or more relays between the source and destination nodes. For example, there can be two or more relay nodes between the source and destination nodes in the arrangement of source node-relay node-relay node-destination node. As exemplified in FIG. 1, it may also be possible for one source node to transmit data to one destination node via different relay nodes.

Figure 2A:
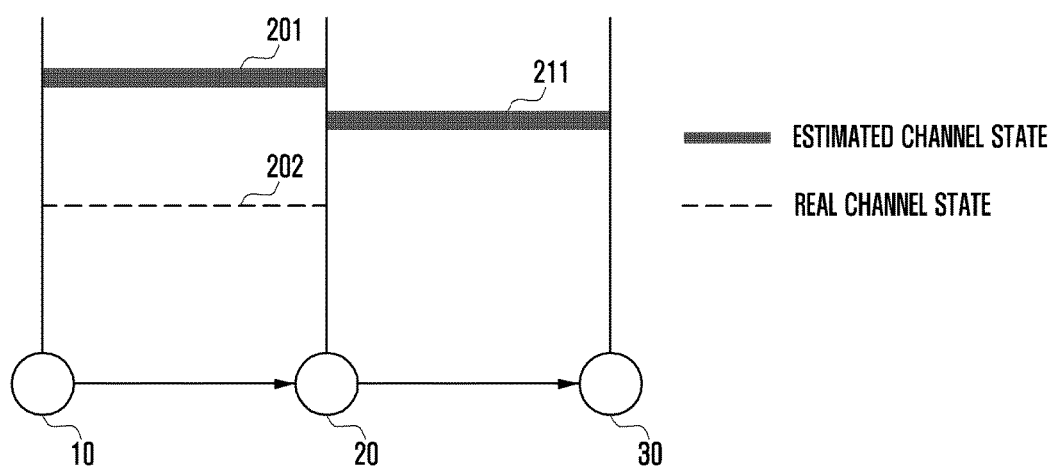
FIGS. 2A to 2C are diagrams illustrating exemplary cases where channel state estimated for data transmission from a source node to a destination node via relay nodes and the real channel state are different from each other.
Figure 2B:
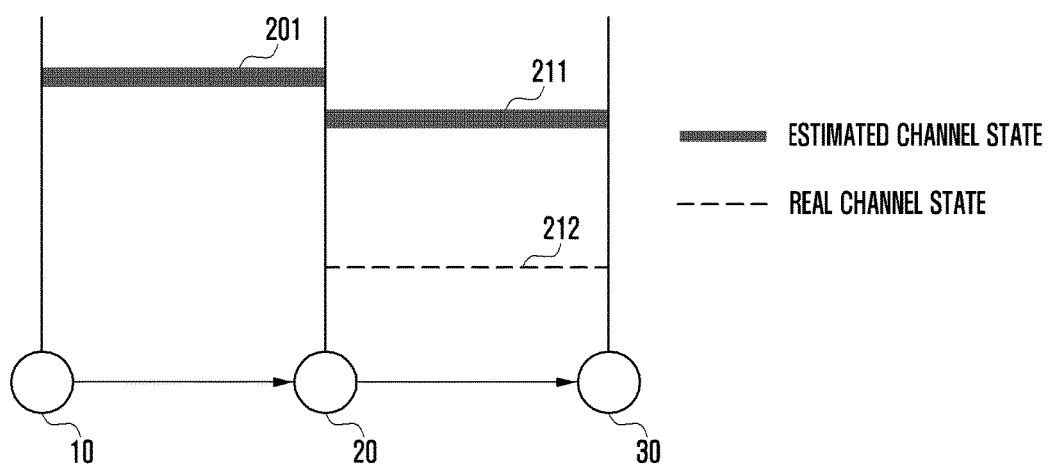
Figure 2C:
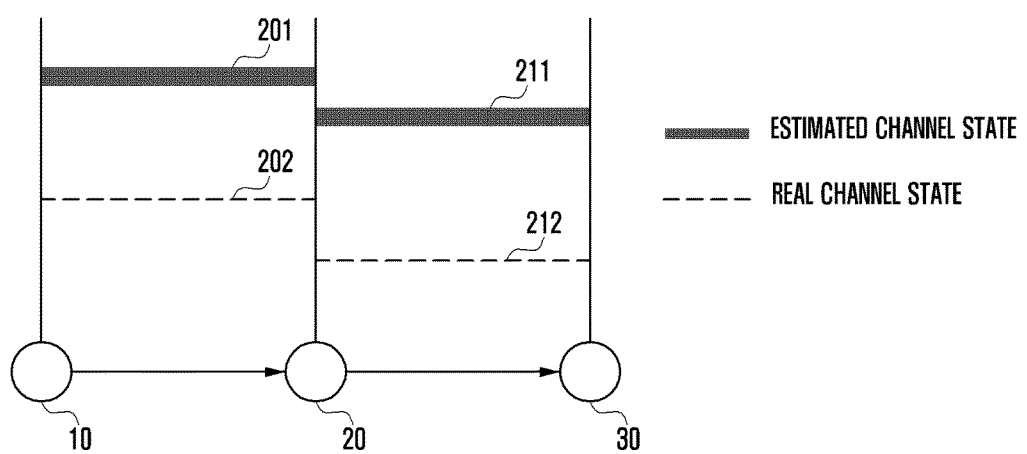

FIGS. 2A to 2C are diagrams illustrating exemplary cases where a channel state estimated for data transmission from a source node to a destination node via relay nodes and the real channel state are different from each other.

FIG. 2A exemplifies a case where the real channel state (denoted by reference number 202) is worse than the estimated channel state (denoted by reference number 201) between the source node 10 and the relay node 20, while the real channel state and the estimated channel state (denoted by reference number 211) between the source node 10 and the relay node 20 are equal to each other.

FIG. 2B exemplifies a case where the real channel state and the estimated channel state (denoted by reference number 201) between the source node 10 and relay node 20 are equal to each other, while the real channel state (212) is worse than the estimated channel state (denoted by reference number 211) between the relay node 20 and the destination node 30.

FIG. 2C exemplifies a case where the real channel state (denoted by reference number 202) is worse that the estimated channel state (denoted by reference number 201) between the source node 10 and the relay node 20, while the real channel state (denoted by reference number 212) is worse than the estimated channel state (denoted by reference number 211) between the relay node 20 and the destination node 30.

As exemplified in FIGS. 2A to 2C, it may occur that the real channel state is worse than the estimated channel state between two consecutive nodes. If the real channel state is worse than the estimated channel state, the data error probability increases on each channel.

Figure 3A:
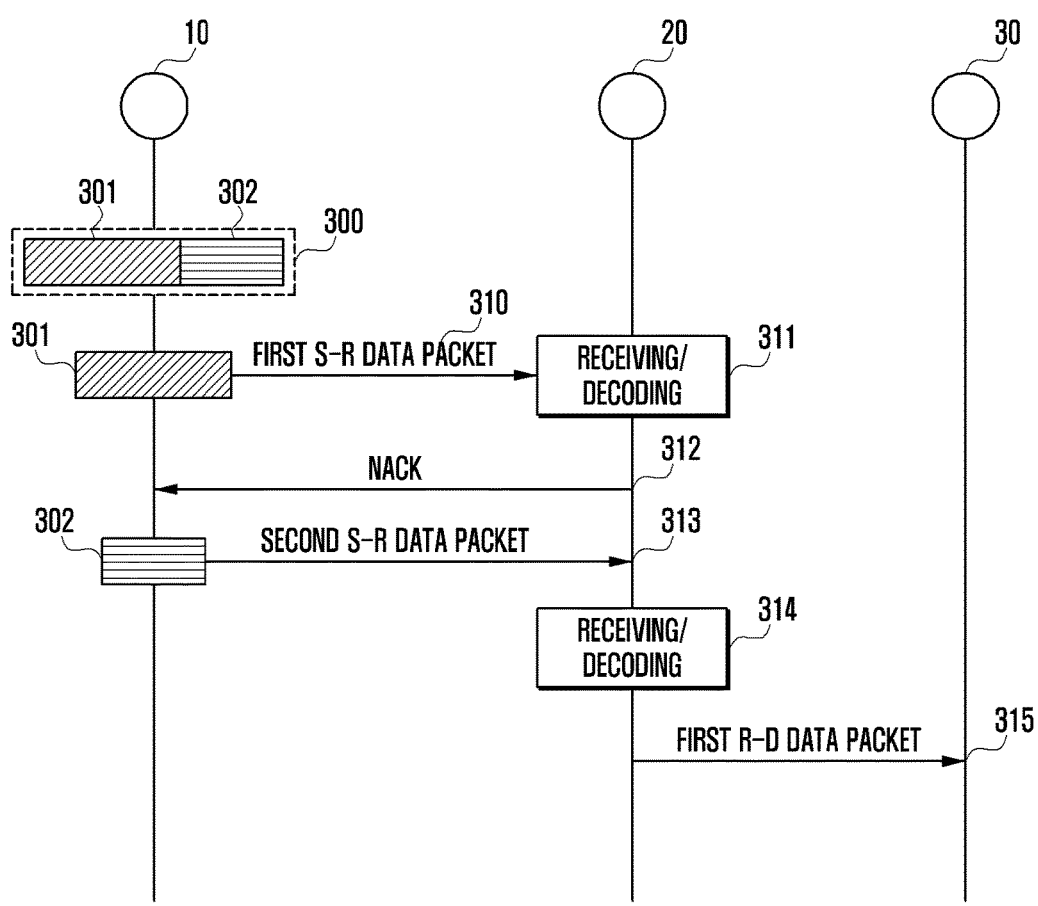
FIGS. 3A to 3C are signal flow diagrams illustrating HARQ retransmission schemes in a DF scheme-based relay wireless communication system.
Figure 3B:
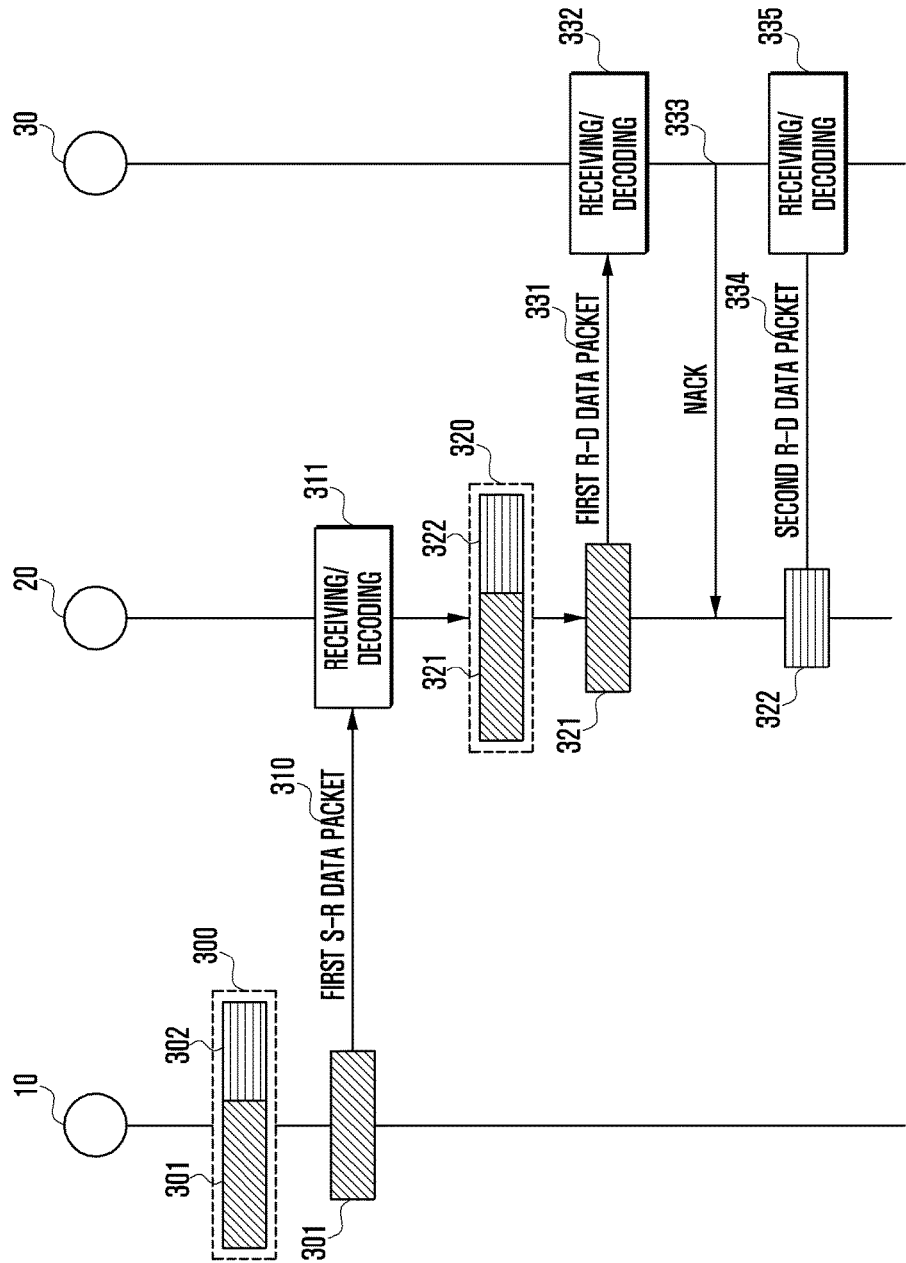
Figure 3C:
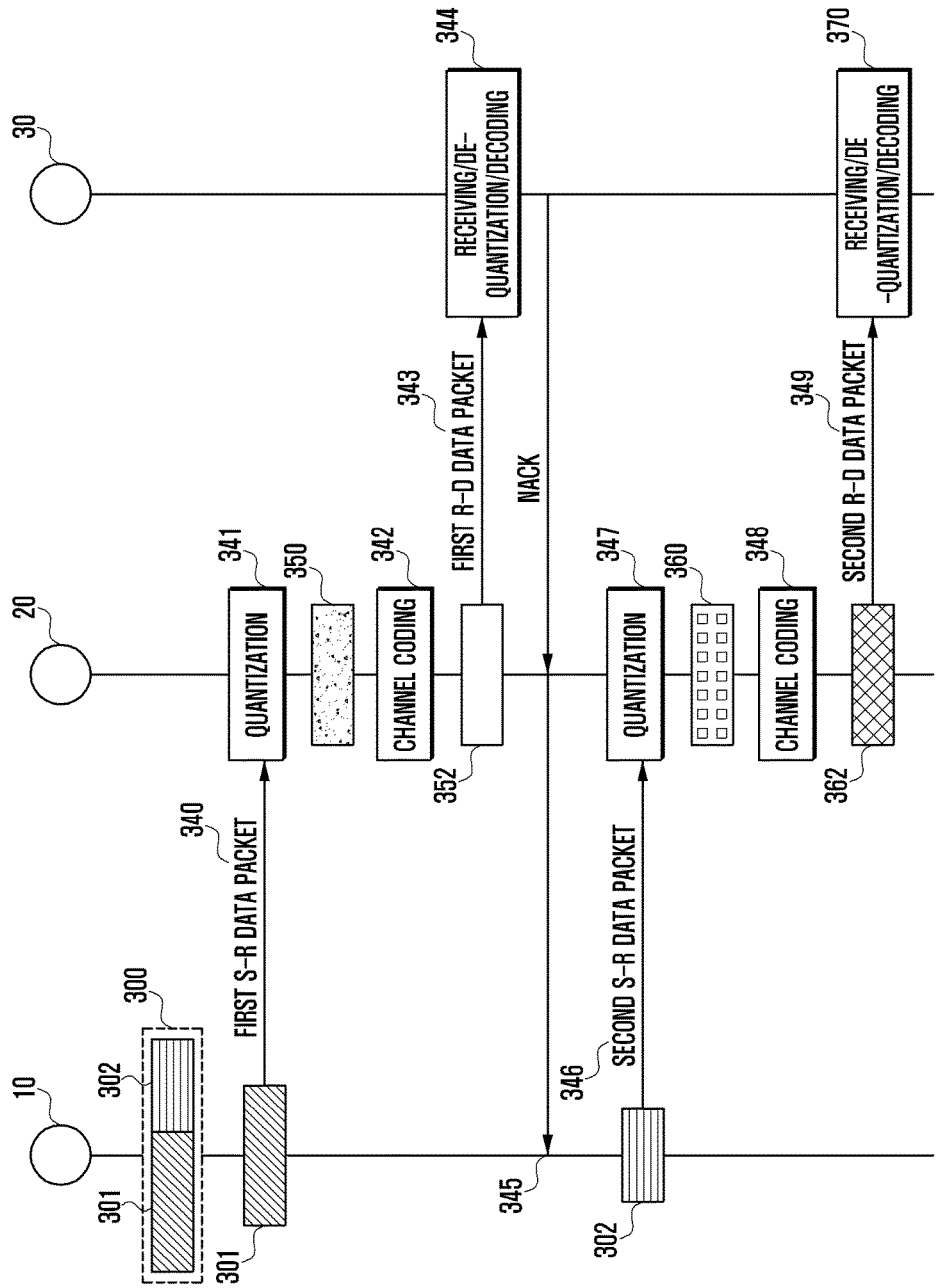

FIGS. 3A to 3C are signal flow diagrams illustrating HARQ retransmission schemes in a DF scheme-based relay wireless communication system.

In reference to FIG. 3A, the source node 10 may transmit data destined for the destination node 30 via the relay node 20. A description is made of the case where the source node 10 transmits data to the destination node via the relay node 20 in the DF scheme-based relay wireless communication system of FIG. 3A.

The source node 10 may perform channel coding on the data to generate channel-coded data 300. The channel-coded data may be larger than the data to be delivered from the source node 10 to the relay node 20 because of the redundancy caused by use of a low coding rate for transmitting data from the source node 10 to another node in the wireless communication system. Accordingly, the source node 10 transmits part of the channel-coded data. The size of a transmission packet may be determined according to the coding rate and channel capacity.

The source node 10 may transmit the first packet 301 (hereinafter, referred to as "first S-R data packet") of the channel-coded data 300 to the relay node 20 at step 310. The relay node 20 receives the first S-R data packet at step 311. The relay node 20 performs decoding and error checking on the first S-R data packet 301 because the relay node uses the DF scheme.

FIG. 3A exemplifies a case where the data transmitted from the source node 10 to the relay node 20 has an error. Such an error may be caused by various environmental factors. The situations of FIGS. 2A and 2C, where the real channel state is worse than the estimated channel state, are representative examples. If an error is detected in the first S-R data packet 301, the relay node 20 transmits a NACK to the source node at step 312.

If the NACK is received at step 312, the source node 10 may transmit to the relay node 20 the next packet 302 (hereinafter, referred to as "second S-R data packet") of the channel-coded data 300 at step 313.

Then the relay node 20 combines the second S-R data packet 302 received at step 313 with the first S-R data packet 301 received at step 311 and performs decoding on the combined packet. FIG. 3A exemplifies a case where no error is detected in the decoded data. The relay node 20 performs channel-coding on the decoded data and transmits the channel-coded data to the destination node 30 at step 315. At this time, the data channel-coded for transmission from the relay node 20 to the destination node 30 may be different in format from or identical with the channel-coded data generated by the source node 10.

FIG. 3B exemplifies a case where the data transmitted from the relay node 20 to the destination node 30 has an error.

In reference to FIG. 3B, the source node 10 may perform channel coding on the data to be transmitted to generate channel-coded data 300. At this time, the channel-coded data may be larger than the data to be delivered from the source node 10 to the relay node 20 because of the redundancy caused by use of a low coding rate for transmitting data from the source node 10 to another node in the wireless communication system. Accordingly, the source node 10 transmits part of the channel-coded data. The size of a transmission packet may be determined according to the coding rate and channel capacity.

The source node 10 may transmit the first packet 301 (hereinafter, referred to as "first S-R data packet") of the channel-coded data 300 to the relay node 20 at step 310. The relay node 20 receives the first S-R data packet at step 311. The relay node 20 performs decoding and error checking on the first S-R data packet 301 because the relay node uses the DF scheme.

FIG. 3B exemplifies a case where no error is detected in the data transmitted from the source node 10 to the relay node 20. If an error is not detected in the first S-R data packet 301, the relay node 20 transmits an ACK to the source node 10 at step 312 (not shown).

The relay node 20 performs channel coding on the decoded data to generate the channel-coded data 320. The channel-coded data 320 may be larger than the data to be delivered from the relay node 20 to the destination node 30 because of the redundancy caused by use of a low coding rate for transmitting data from the relay node 20 to another node in the wireless communication system. Accordingly, the relay node 20 transmits part of the channel-coded data. The size of a transmission packet may be determined according to the coding rate and channel capacity.

The relay node 20 may transmit the first transmission packet 321 (hereinafter, referred to as "first R-D data packet") of the channel-coded data 320 to the destination node 30 at step 331. The destination node 30 receives the first R-D data packet 321 at step 331. The destination node 30 performs decoding and error checking on the first R-D data packet 321 because the destination node uses the DF scheme.

FIG. 3B exemplifies a case where an error is detected in the data transmitted from the relay node 20 to the destination node 30. Such an error may be caused by various environmental factors. The situations of FIGS. 2A and 2C, where the real channel state is worse than the estimated channel state, are representative examples. If an error is detected in the first R-D data packet 321, the destination node 30 transmits a NACK to the relay node 20 at step 333.

If the NACK is received at step 333, the relay node 20 may transmit to the relay node 20 the next packet 322 (hereinafter, referred to as "second R-D data packet") of the channel-coded data 300 at step 334.

Then the destination node 30 combines the second R-D data packet 322 received at step 334 with the first R-D data packet 321 received at step 33 1and performs decoding on the combined packet. FIG. 3B exemplifies a case where no error is detected in the decoded data. The destination node 30 may transmit to the relay node 20 an ACK corresponding to the received packet (not shown).

FIG. 3C shows a scenario of an HARQ retransmission scheme in a relay wireless communication system operating with the CF scheme.

In reference to FIG. 3C, the source node 10 may perform channel coding on the data to be transmitted to generate channel-coded data 300 as described above. At this time, the channel-coded data may be larger than the data to be delivered from the source node 10 to the relay node 20. The data may be processed into the same format regardless of using the DF or CF format. As described above, the data transmitted from the source node 10 to another node is channel-coded with a low coding rate in the wireless communication system so as to cause redundancy. Accordingly, the source node 10 transmits part of the channel-coded data. The size of a transmission packet may be determined according to the coding rate and channel capacity.

The source node 10 may transmit the first packet 301 (hereinafter, referred to as "first S-R data packet") of the channel-coded data 300 to the relay node 20 at step 340. Accordingly, the relay node 20 receives the first S-R data packet at step 340. The relay node 20 quantizes the first S-R data packet 301 to acquire quantized data 350 at step 341 because the relay node uses CF scheme. Then the relay node 20 performs channel coding on the quantized data 350 to acquire channel coded data 352 at step 342. If the channel coded data 352 is acquired, the relay node 20 may transmit the channel coded data packet 352 to the destination node 30 at step 343. The destination node 30 receives the quantized and channel-coded data packet 352 from the relay node 20 at step 344. The destination node 30 also performs de-quantization and channel decoding on the received data packet 352 to detect errors at step 344 because the destination node uses CF scheme.

FIG. 3C exemplifies a case where an error is detected on at least one of the channel between the source node 10 and the relay node 20 and the channel between the relay node 20 and the destination node 30. FIGS. 2A to 2C show representative examples of such situations.

Accordingly, if an error is detected in the data packet 352, the destination node 30 may transmit a NACK to the source node 10 directly or via the relay node 20 at step 345.

If the NACK is received at step 345, the source node 10 transmits to the relay node 20 the next packet, i.e., the second S-R data packet 302, of the channel-coded data packet 301 at step 346. Accordingly, the relay node 20 quantizes the second S-R data packet at step 347 to acquire the quantized data 360. Then the relay node 20 performs channel coding on the quantized data 360 at step 348 to acquire channel-coded data 362. If the channel-coded data 362 is acquired, the relay node 20 transmits the channel-coded data 362 to the destination node 30 at step 349.

Then the destination node 30 performs de-quantization on the received packet, combines the packet de-quantized at step 370 with the packet de-quantized at step 344, and performs decoding on the combined packet. Depending on the decoding result, an HARQ NACK or ACK operation may be performed.

In the case of using the CF scheme, the packet transmission is performed via the channel between the source and relay nodes and the channel between the relay and destination nodes through the procedure as exemplified in FIG. 3C; however, in the case of using the CF scheme, there is no further operation subsequent to the transmission of the HARQ NACK corresponding to the data transmitted from the relay node 20 to the destination node 30. This means that retransmission is always issued from the source node 10 because a data retransmission decision is made only by the destination node in the CF scheme.

Particularly when the real channel state is or becomes worse than the estimated channel state on both the link between the source and relay nodes and the link between the relay and destination nodes, it is always necessary to perform both the end-to-end HARQ and the relay-destination nodes HARQ simultaneously in the CF-based relay protocol. In such a case, the source and destination nodes have to communicate signaling information and retransmission data through multi-hop links therebetween, resulting in a significant increase of HARQ processing delay.

The present invention proposes a quantization method for compressing data to be transmitted from the relay node 20 to the destination node 30 by quantizing the transmission data to have more bits in number than bits required for transmission in adaptation to the channel characteristics. Afterward, only a part of the quantized information bits are transmitted to the destination node 30. Accordingly, the next node, e.g. destination node 30, has to have a capability of de-quantizing the part of the quantized information bits into normal data.

The relay node is configured to transmit the residual bits of the quantized bits when an HARQ NACK indicating error detection is received from the next node (i.e., relay node or destination node). Thus the next node (relay or destination node) subsequent to the relay node is capable of recovering the original data by combining the newly received part of the quantized information with the previously received part of the quantized information.

By using this method, when the real channel state is or becomes worse than the estimated channel state between the source and relay nodes and/or between the relay and destination nodes, the relay node transmits the residual quantized redundancy information to the destination node, thereby improving channel efficiency and reducing multi-hop signaling delay. Also, by minimizing an end-to-end HARQ operation, it is possible to reduce dramatically the transmission delay caused by multi-hop signaling and retransmission between the source and destination nodes.

The quantization technique for compressing data to be transmitted from the relay node 20 to the destination node 30 to achieve the above object is referred to hereinafter as "fine quantization" and is performed in a nested structure.

Figure 4A:
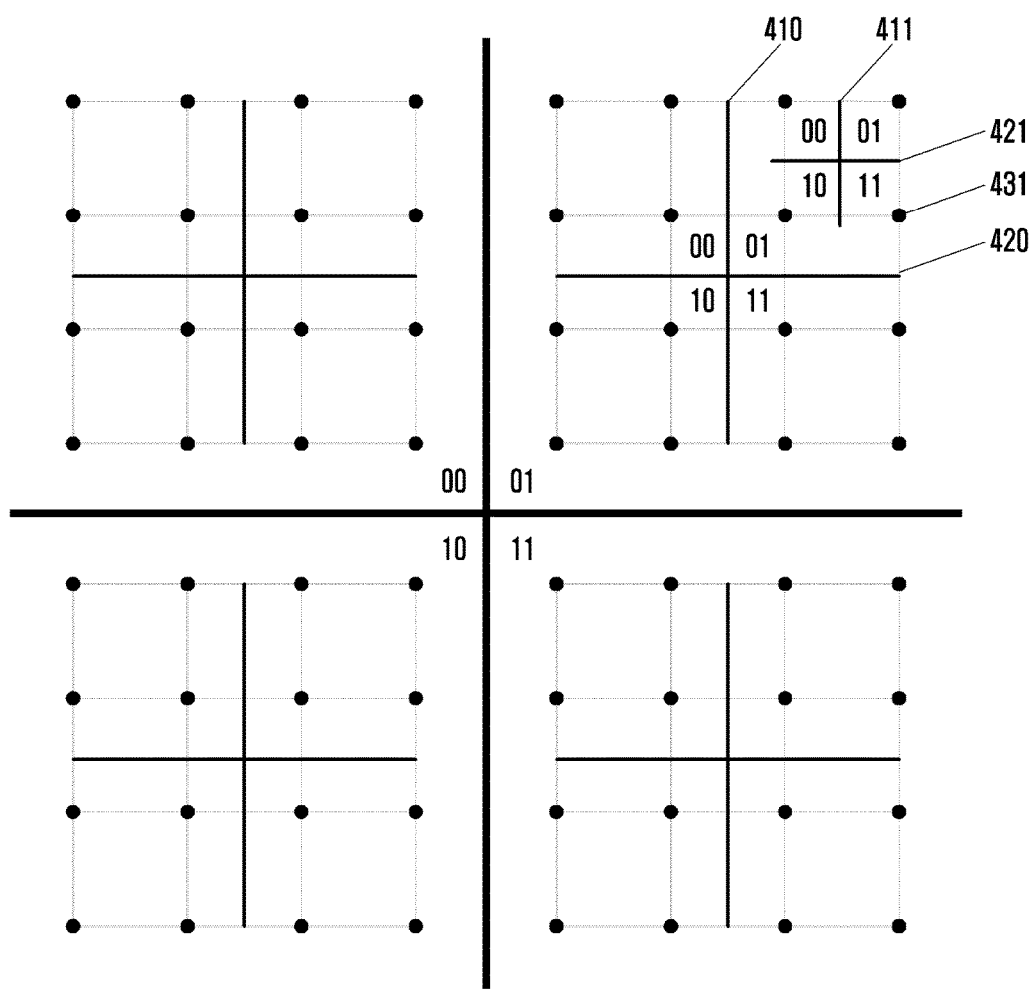
FIGS. 4A to 4C are diagrams for explaining a nested quantization method according to an embodiment of the present invention.
Figure 4B:
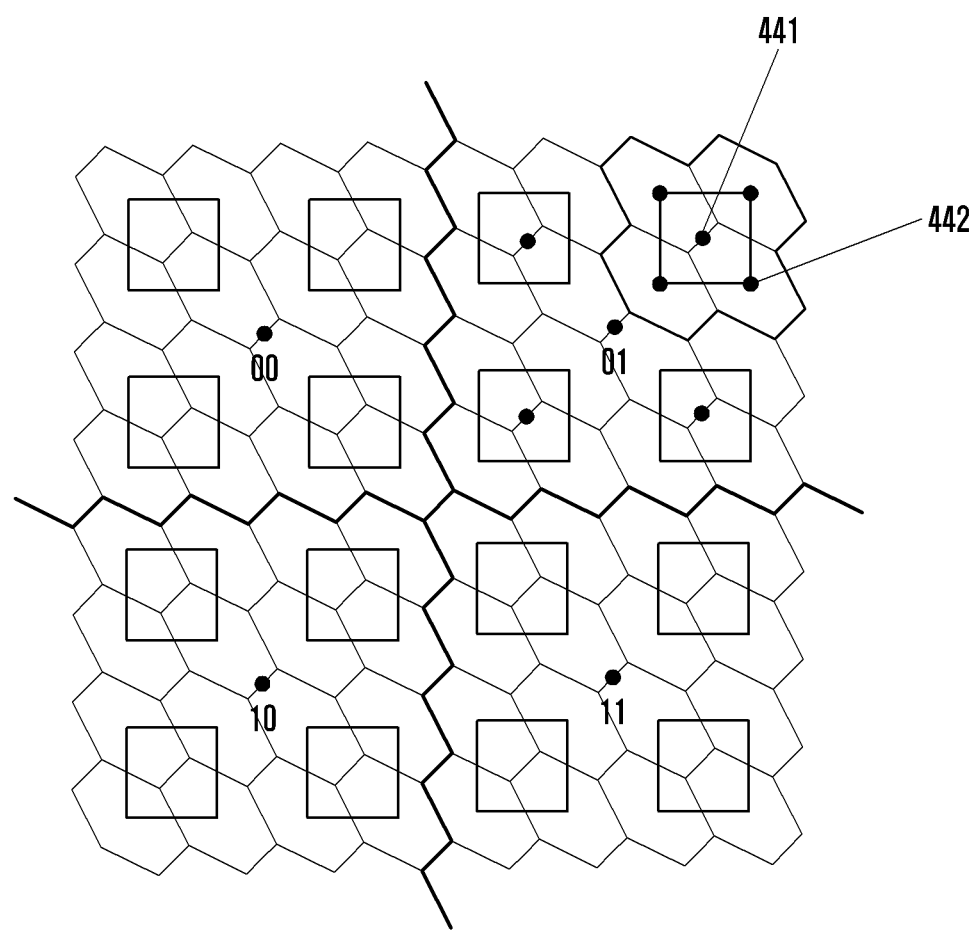
Figure 4C:
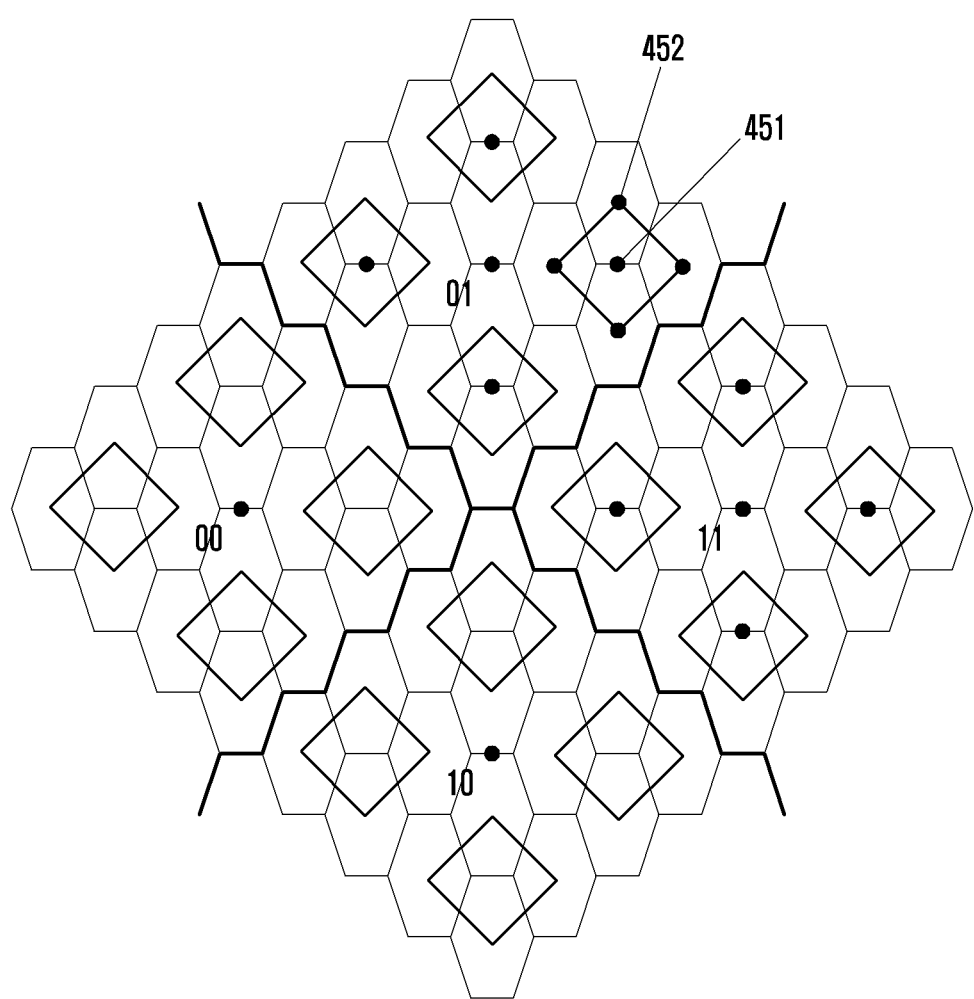

FIGS. 4A to 4C are diagrams for explaining a nested quantization method according to an embodiment of the present invention.

FIG. 4A shows a mapping rule for compressing and quantizing a signal transmitted by the source node 10. For example, the phase of the received signal is identified by two bits assigned to quadrants, the two bits being set to 01 for the first quadrant, 00 for the second quadrant, 10 for the third quadrant, and 11 for the fourth quadrant.

Also, the first quadrant is divided again into 4 sub-quadrants by two lines 410 and 420 to indicate the phase more finely. For example, the first quadrant is divided into four sub-quadrants by the lines 410 and 420, the four sub-quadrants also being identified by two bits.

In the first quadrant identified by 01, the phase of the received signal is more finely identified by two subsequent bits assigned to sub-quadrants, the two bits being set to 01 for the first quadrant, 00 for the second quadrant, 10 for the third quadrant, and 11 for the fourth quadrant.

Likewise, the first sub-quadrant of the first quadrant may be sub-divided into four sub-sub-quadrants by two lines 411 and 421. In this case, the quadrants are two bits of 01 for the first quadrant, 00 for the second quadrant, 10 for the third quadrant, and 11 for the fourth quadrant.

In the embodiment of FIG. 4A, the symbol 431 consists of 6 bits of 010111. Using this information, it is possible to identify that the received signal is mapped to a point that is located in the first quadrant based on the first two bits of 01 and, in detail, the first sub-quadrant based on the second two bits of 01. Furthermore, it is possible to locate the received signal in the fourth sub-sub-quadrant based on the last two bits of 11.

By determining the position of the received signal in one of the quadrants and then one of the sub-quadrants of the determined quadrant per 2 bits sequentially, it is possible to estimate the signal position accurately. In the present invention, such a way of quantizing a signal by narrowing down the position is referred to as "nested quantization" or "nested type quantization".

As described above, the relay node generates the quantized data in a larger amount than that required to be transmitted to the next node. Suppose that the relay node transmits 4-bit quantized information to the next node. In this case, the relay node may perform quantization to generate 6-bit quantized information. At this time, the 4 Most Significant Bits (MSBs) of the 6-bit quantization information are actually transmitted. Even in this case, the relay node performs channel coding on the MSBs to be transmitted. In the following description, the packet comprised of the same data for HARQ retransmission is referred to as "first R-D data packet". Accordingly, whenever the source node 10 transmits a new packet, the relay node 20 has to transmit the first R-D data packet to the destination node 30. In the following description, a packet retransmitted, when the first R-D data packet is erroneous, is referred to as the second R-D data packet or the third R-D data packet. That is, the data packet including the redundancy bits that is retransmitted in the first HARQ round is referred to as the second R-D data packet, and the data packet including the redundancy bits that is retransmitted in the second HARQ round is referred to as the third R-D data packet.

If a NACK is received from the next node (e.g. destination node), the relay node may perform channel coding on the 2 Least Significant Bits (LSBs) that are the non-transmitted part of the quantized information and transmit the channel coded information to the destination node.

Accordingly, the destination node may combine the quantized information transmitted in response to the NACK with the previously received quantized information and perform de-quantization and decoding on the combined information.

Although the above-description has been made with reference to FIG. 4A, the same principle is applicable to FIGS. 4B and 4C. FIG. 4B differs from FIG. 4A in that the quadrants are not formed by straight lines. The symbol position 441 may be indicated by four bits of 0101 and the symbol position 442 may be indicated by six bits of 010111, based on the same principle as above. Even in this case, the relay node 20 may perform channel coding on the 4 MSBs of the quantized information and transmit the channel-coded information to the destination node 30 and, if a NACK is received, perform channel coding on the 2 LSBs of the quantized information and transmit the channel-coded information to the destination node 30.

The embodiment of FIG. 4C is characterized in that the quadrants are rotated about 45 degrees in the counter-clockwise direction from FIG. 4B. Even in this case, the first quadrant is represented by 01, and the fourth sub-quadrant of the first quadrant is represented by 11. Accordingly, if the phase of the received signal matches the position 451, the relay node may transmit the symbol 0111 to the destination node. If a NACK is received from the destination node, the relay node may perform channel coding on the last 2 bits of 01 of the previously generated information of 011110 for the position 452 matching the phase of the received signal and transmit the channel-coded information to the destination node.

Hereinafter, descriptions are made of the configurations of the relay and destination nodes on the basis of the above description.

Figure 5:
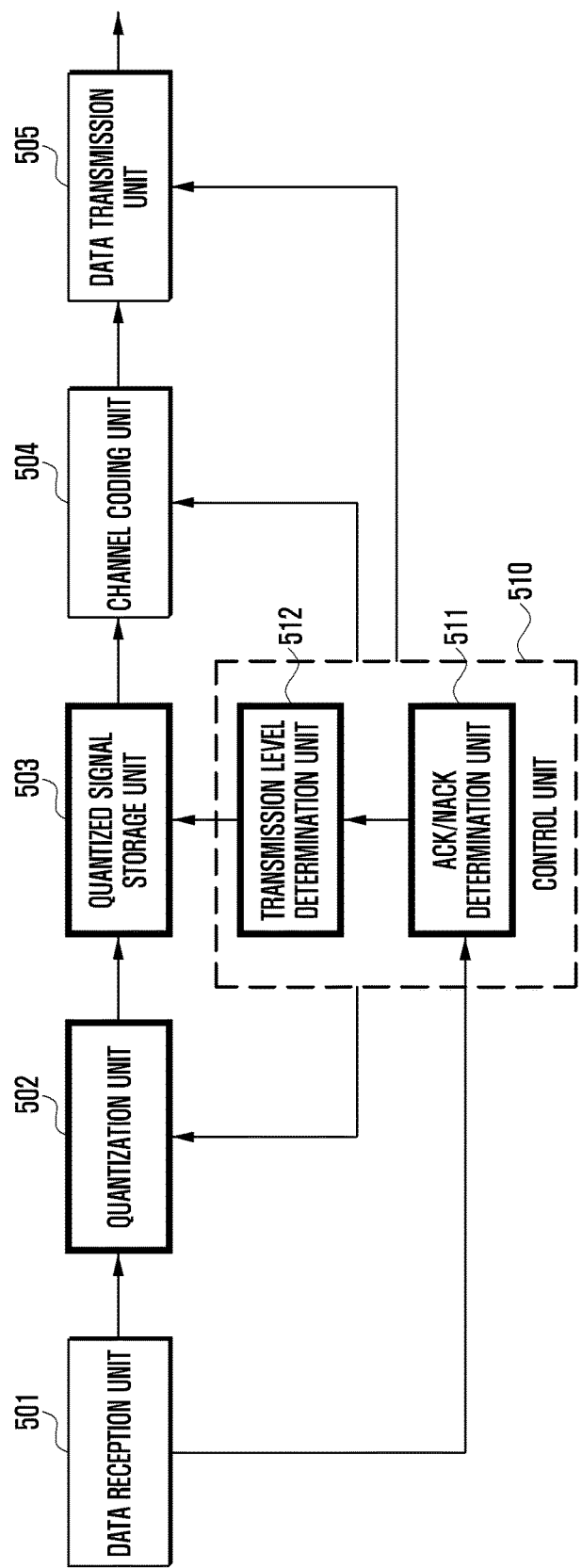
FIG. 5 is a block diagram illustrating a configuration of a relay node for use in a relay wireless communication system using a CF scheme according to an embodiment of the present invention.

FIG. 5 is a block diagram illustrating a configuration of a relay node for use in a relay wireless communication system using a CF scheme according to an embodiment of the present invention.

In reference to FIG. 5, the data reception unit 501 receives a channel-coded signal transmitted by the source node in a predetermined band and performs down-converting on the received signal. The signal down-converted by the data reception unit 501 may be a baseband analog signal. The baseband analog signal is input to the quantization unit 502.

The quantization unit 502 performs quantization using a nested quantization technique under the control of the control unit 510 as described with reference to FIGS. 4A to 4C according to an embodiment of the present invention. The control unit 510 may be configured with one of the quantization schemes described with reference to FIGS. 4A to 4C or a like scheme. This configuration may be made by the CF scheme-based relay wireless communication system or it may be agreed in advance to use one of the quantization schemes described with reference to FIGS. 4A to 4C or a like scheme between the nodes.

The quantization unit 502 performs quantization under the control of the control unit 510 such that the actually quantized information amount is greater than the information required for transmission. For example, if the quantized information required for transmission is 4 bits, quantization is performed to generate 6-bit information as described with reference to FIG. 4A.

The quantized information is input to the quantized signal storage unit 530 and stored therein. At this time, the transmission level determination unit 512 of the control unit 510 determines the quantized information amount to be transmitted among the quantized data stored in the quantization signal storage unit 503. For example, the control unit controls to output 4 MSBs of the quantized information for the first R-D data packet and 2 LSBs of the quantized information for the second R-D data packet.

Accordingly, the quantized signal storage unit 503 outputs part of the quantized information to the channel coder 504. The channel coder 504 performs channel coding on the quantized information under the control of the control unit 510. At this time, the channel coding rate may be determined by the control unit 510 or based on the channel condition between the relay and destination nodes. The packet channel-coded by the channel coder 504 is input to the data transmission unit 505.

The data transmission unit 505 may transmit the channel-coded packet to the destination node under the control of the control unit 510, the packet being carried in a carrier signal transmitted in a band for signal transmission to the destination node.

If an ACK/NACK is received from the destination node, the data reception unit 501 may transfer the ACK/NACK to the control unit 510. At this time, an analog-digital converter (not shown) may be interposed between the control unit 510 and the data reception unit 501. The ACK/NACK determination unit 511 of the control unit 510 determines whether to transmit the next data or retransmit the transmitted data. If it is necessary to perform retransmission, the transmission level determination unit 512 controls the quantized signal storage unit 503 to output a non-transmitted part of the quantized information to the channel coding unit 504. The control unit 510 may control the channel coding unit 504 and the data transmission unit 505 to transmit the non-transmitted part of the quantized information in the retransmission operation.

Figure 6:
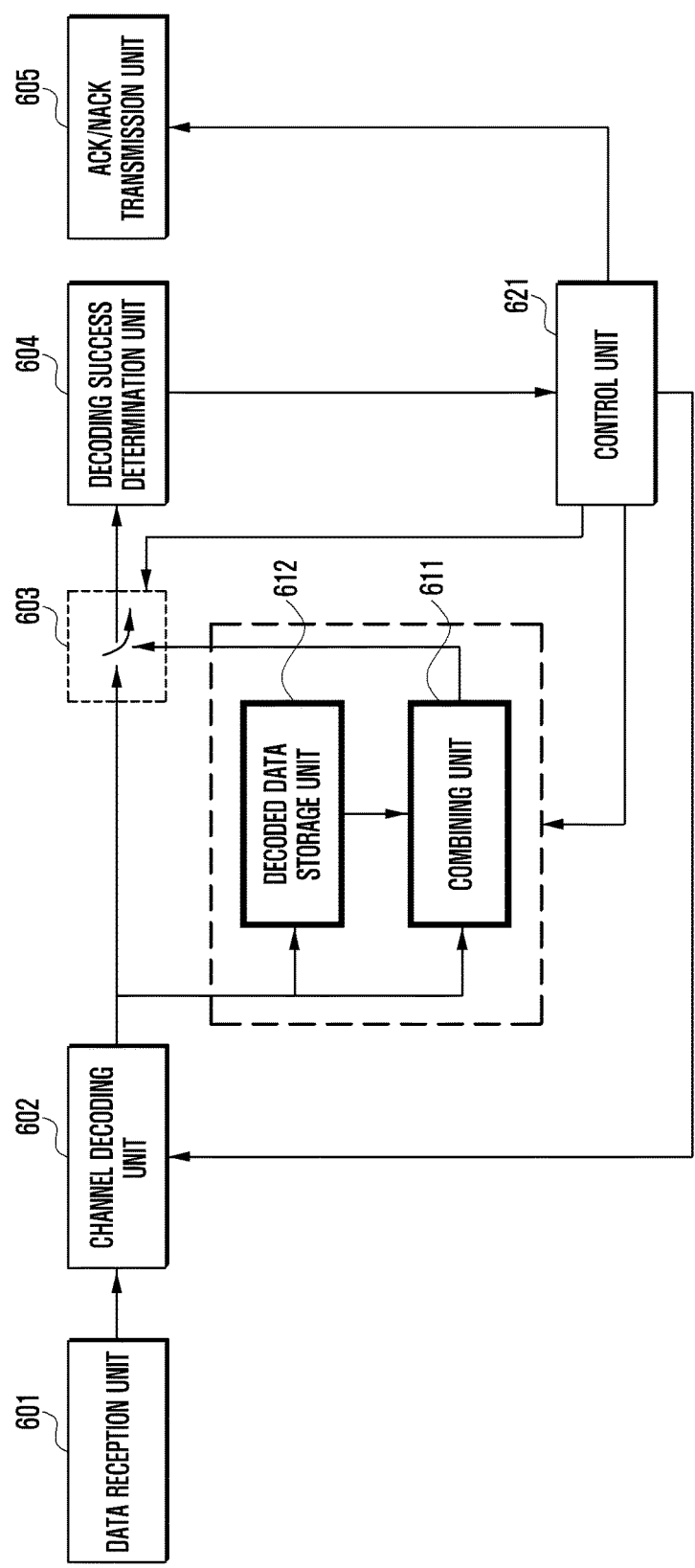
FIG. 6 is a block diagram illustrating a configuration of a destination node for use in a relay wireless communication system using a CF scheme according to an embodiment of the present invention.

FIG. 6 is a block diagram illustrating a configuration of a destination node for use in a relay wireless communication system using a CF scheme according to an embodiment of the present invention.

In reference to FIG. 6, the data reception unit 601 receives a quantized signal which has been channel coded and transmitted by the relay node 20 and performs down-converting on the received signal. The signal down-converted by the data reception unit 601 may be a baseband analog signal. The baseband analog signal is input to the channel decoding unit 620.

The channel decoding unit 602 performs channel decoding on the quantized information because the quantized information is channel-coded by the relay node. If the decoded signal is the first R-D data packet, the first R-D data packet is input to the decoding success determination unit 604 and the decoded data storage unit 612. At this time, a switch 603 may be interposed between the decoding success determination unit 604 and the channel decoding unit 603. The switch 603 may switch between the output signals from the channel decoding unit 602 and the combining unit 611 to the decoding success determination unit 604 under the control of the control unit 621. For example, if the first R-D data packet is received, the control unit 621 controls the switch 603 to connect the output of the channel decoding unit 602 to the input of the decoding success determination unit 604. Meanwhile, if the second R-D data packet is received, the control unit 602 controls the switch 603 to connect the output of the combining unit 611 to the input of the decoding success determination unit 604.

Also, if the second R-D data packet is received, the control unit 621 controls such that the quantized data stored in the decoded data storage unit 612 and the data output from the channel decoding unit 602 are input to the combining unit 611. As a consequence, the combining unit 611 combines the quantized information of the first R-D data packet and the quantized information of the second R-D data packet.

The decoding success determination unit 604 may determine whether the information is successfully received using a determination scheme, e.g. CRC text. The determination result is provided to the control unit 621.

The control unit 621 controls the ACK/NACK transmission unit to transmit an ACK or a NACK to the relay node depending on whether the decoding succeeded or failed.

Figure 7:
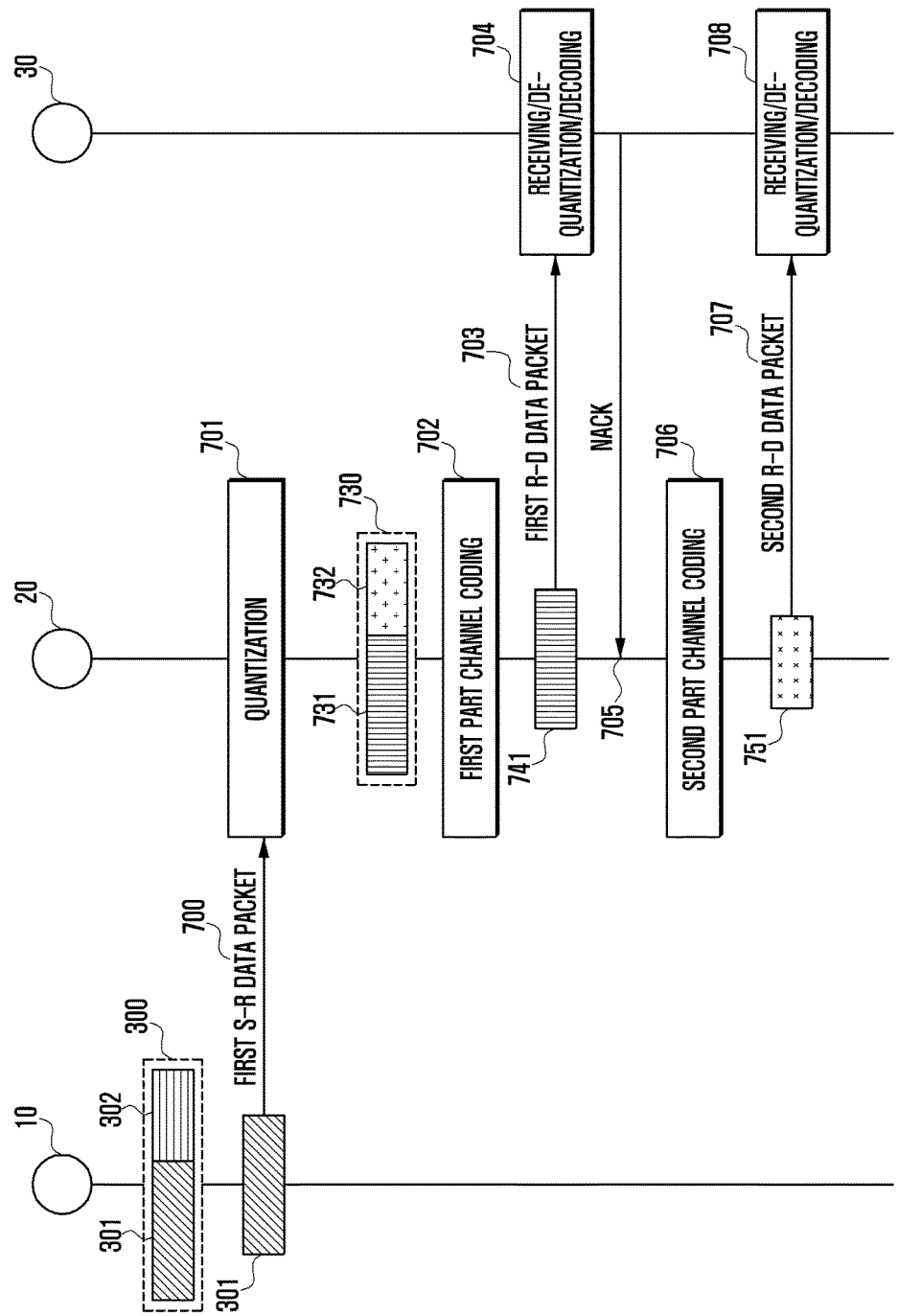
FIG. 7 is a diagram illustrating an HARQ retransmission scenario in a relay wireless communication system using a CF scheme according to an embodiment of the present invention.

FIG. 7 is a diagram illustrating a HARQ retransmission scenario in a relay wireless communication system using a CF scheme according to an embodiment of the present invention.

In reference to FIG. 7, the source node 10 may perform channel coding on the transmission data to generate the channel-coded data 300 as described above. The channel-coded data 300 may be larger than the data amount to be transmitted to the relay node 20. As described above, the data transmitted from the source node 10 to another node is channel-coded with a low coding rate in the wireless communication system so as to cause redundancy. Accordingly, the source node 10 transmits part of the channel-coded data. The size of a transmission packet may be determined according to the coding rate and channel capacity.

The source node 10 may transmit the first packet 301 (hereinafter, referred to as "first S-R data packet") of the channel-coded data 300 to the relay node 20 at step 700. The relay node 20 receives the first S-R data packet 301 at step 700. The relay node 20, which uses the CF scheme, quantizes the first data packet 301 to acquire the quantized data 730 at step 701. At this time, the quantization is performed to generate redundant information in a nested manner as described with reference to FIGS. 4A to 4C.

As described above, the relay node 20 performs quantization such that the quantized data is larger than the data amount to be actually transmitted on the channel, i.e., so as to generate redundant information, according to the present invention. Accordingly, in view of quantized data amount, it may appear that the CF scheme is not applied. However, the quantized data with redundancy is not transmitted in whole but in part. The initial transmission part of the whole quantized data may be the first part data 731. The size of the whole quantized data may be determined according to the number of HARQ rounds between the rely node 20 and the destination node 30. If the number of HARQ rounds is set to 1, this means two potential transmissions including the initial transmission and retransmission; thus, the quantization level may be adjusted such that the quantized data is larger than the data amount for one transmission round and equal to or less than the data amount for two transmission rounds. The quantization level may be adjusted in the same manner when the number of HARQ rounds increases to 2 or 3.

FIG. 7 is depicted under the assumption that the number of HARQ retransmissions is limited to 1. The quantized data 730 acquired through quantization at step 701 may be divided into the first part data 731 and the second part data 732. If the number of HARQ retransmissions is limited to 2, the quantized data is divided into the first part data, the second part data, and the third part data for the initial transmission and two retransmission rounds. At this time, the first part data is the data being transmitted initially.

The relay node 20 performs channel coding on the first part data 731 to acquire the channel-coded first part data 741 at step 702. This means to perform channel coding on the data necessary for initial transmission. If the first R-D data packet 741 is acquired through channel coding on the first part data 731, the relay node transmits the first R-D data packet 741 to the destination node 30 at step 703. In the following description, the term "first R-D data packet" denotes the data packet generated for initial transmission as part of the quantized data acquired by quantizing the data received from the source node 10 to have redundant information.

Accordingly, the destination node 30 receives the quantized and channel-coded data from the relay node 20 and performs de-quantization and decoding on the received data at step 704. The destination node 30 may perform an error check on the decoded data at step 704 and transmit an ACK/NACK to the relay node 20 rather than the source node 10 according to the error checking result. In the present invention, the destination node 30 transmits the ACK/NACK generated as the decoding result to the relay node 20 rather than to the source node 10 such that HARQ retransmission is performed between the relay node 20 and the destination node 30.

FIG. 7 is depicted under the assumption that an error is detected in the first R-D data packet transmitted initially from the relay node 20 and the destination node. Accordingly, the destination node 30 transmits to the relay node 20 a NACK indicating that the initially transmitted first R-D data packet is decoded erroneously at step 705.

The relay node that has received the NACK transmitted at step 705 is in the state of not having transmitted the second part data 732 after quantizing the data to have redundant information. As described above, the first part data 731 and the second part data 632 may be generated through the nested quantization.

At step 706, the relay node 20 performs channel coding on the second part data 732 of the quantized data, which is generated at step 701 to have redundant information, to acquire the channel-coded second R-D data packet 751. In the present invention, the terms "second R-D data packet", "third R-D data packet", and the like denote HARQ retransmission packets.

After acquiring the second R-D data packet 751, the relay node 20 may transmit the second R-D data packet 751 to the destination node at step 707. Accordingly, the destination node 30 receives the second R-D data packet 751 and performs de-quantization thereon at step 708. Next, the destination node 30 combines the de-quantized data of the first R-D data packet 741 transmitted initially at step 704 and the de-quantized data of the second R-D data packet 751 transmitted at step 707 and performs decoding on the combined data. By combining the de-quantized data, it is possible to increase the decoding success probability because the transmitted data packets are the data quantized to have redundant information in the nested structure as described with reference to FIGS. 4A to 4C.

The destination node 30 de-quantizes the received data, combines de-quantized data with the previously received and de-quantized data, and performs decoding on the combined data at step 708. The destination node 30 may request to the source node 10 or the relay node 30 for retransmission according to the limited number of HARQ retransmission rounds at step 708.

Figure 8:
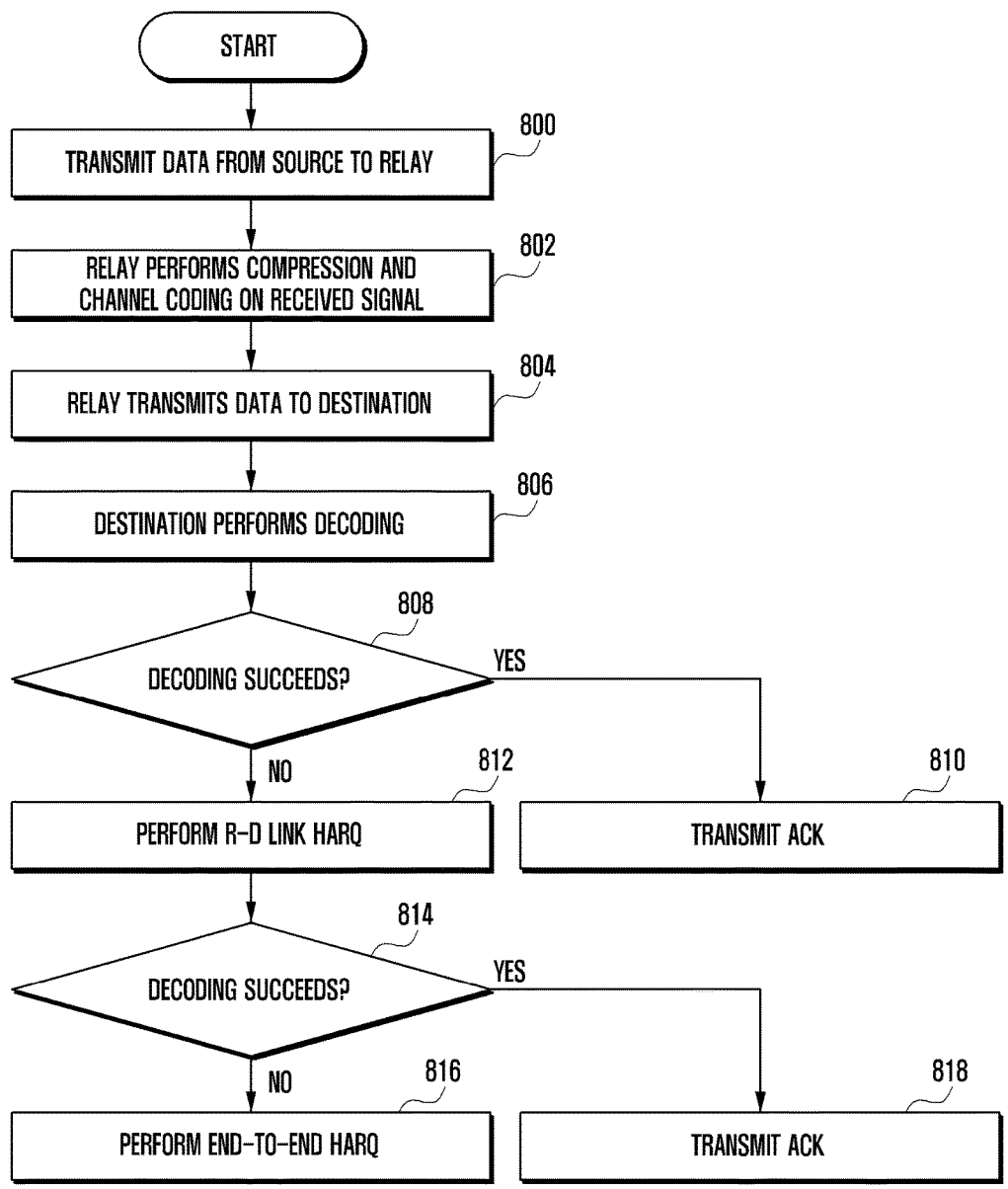
FIG. 8 is a flowchart illustrating an HARQ operation scenario in a relay wireless communication system using a CF scheme according to an embodiment of the present invention.

FIG. 8 is a flowchart illustrating an HARQ operation scenario in a relay wireless communication system using a CF scheme according to an embodiment of the present invention.

In reference to FIG. 8, the source node 10 transmits data to the relay node 20 at step 800. At this time, the source node 10 performs channel coding on the data packet to be transmitted. If the channel-coded packet is received, the relay node 20 performs down-converting and nested quantization on the received signal to compress the data at step 802. At step 802, the relay node 20 performs the nested quantization to acquire the quantized data with redundant information, the quantized data being larger than the data amount to be transmitted. Afterward, the relay node performs channel coding on part (e.g., predetermined number of MSBs) of the quantized data.

After performing the channel coding at step 802, the relay node transmits the channel-coded data packet to the destination node 30 at step 804. The destination node 30 performs decoding on the received packet at step 806. Next, the destination node 30 determines whether the received packet is decoded successfully at step 808. If the packet is decoded successfully, the destination node 30 transmits an ACK to the relay node at step 810.

Otherwise if it is determined that decoding the received packet fails at step 808, the destination node 30 performs HARQ between the relay node 20 and the destination node 30 at step 812. The HARQ operation may be performed a predetermined number of times. If the number of HARQ retransmission rounds is limited to 2, the relay node 20 may transmit data to the destination node 30 three times for the initial transmission and two retransmission rounds; if the number of HARQ retransmission rounds is limited to 1, the relay node 20 may transmit data to the destination node 30 twice for the initial transmission and one retransmission round.

In this way, the relay node 20 may transmit between the relay node 20 and the destination node 30 the redundant information additionally using the HARQ process, and the destination node 30 may acquire the redundant information additionally. The destination node 30 may combine the redundant information acquired through the HARQ process between the relay node 20 and the destination node 30 with the previously received information and perform decoding on the combined information.

Next, the destination node 30 determines at step 814 whether the combined information is decoded successfully. If it is determined at step 814 that the combined information is decoded successfully, the destination node transmits an ACK to the relay node 20 at step 818. Otherwise, if it is determined at step 814 that the combined information decoding fails, the destination node 30 performs an end-to-end link HARQ at step 816. The end-to-end link HARQ means to request to the source node 10 for retransmission.

Figure 9:
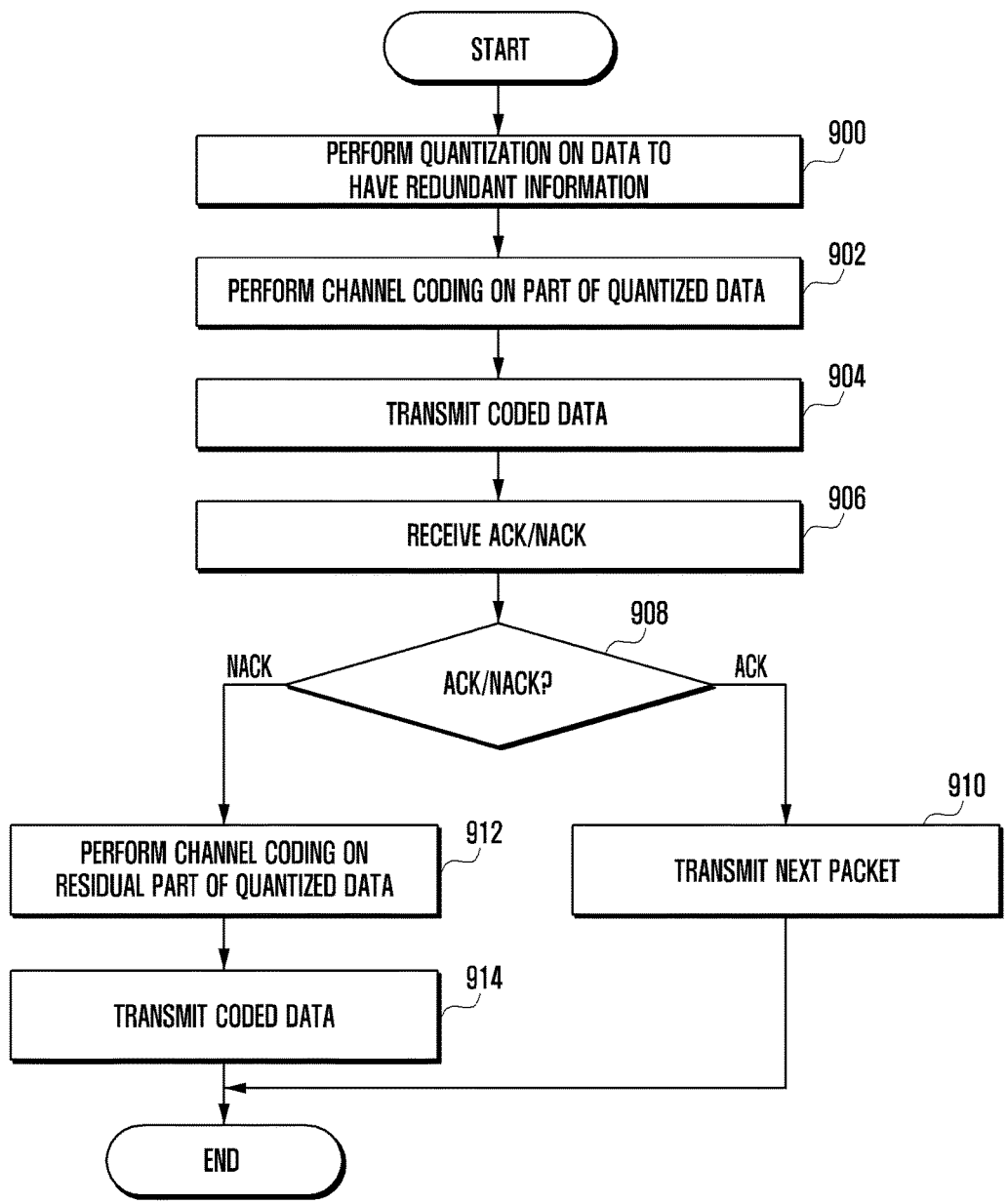
FIG. 9 is a flowchart illustrating an HARQ operation of a relay node in a relay wireless communication system using a CF scheme according to an embodiment of the present invention.

FIG. 9 is a flowchart illustrating an HARQ operation of a relay node in a relay wireless communication system using a CF scheme according to an embodiment of the present invention.

If the data destined for the destination node 30 is received from the source node 10, the relay node 20 performs quantization on the received data to have redundant information at step 900. Quantizing data to have redundant information means that the quantization is performed such that the quantized data is larger than the data amount to be transmitted. For example, in the case of transmitting 4-bit quantized information, the quantization is performed to generate 6-bit quantized information as described with reference to FIGS. 4A to 4C. Assuming that the first R-D data packet that is initially transmitted is 4 bits, the 4-bit information may be compressed data because the CF scheme is used.

The redundant information amount may be changed according to the limited number of HARQ retransmission rounds. If the limited number of HARQ retransmission rounds is 1, data transmission may be performed twice for initial transmission and one retransmission round. The quantized information amount including redundant information may be greater than the data amount for one transmission round and equal to or less than the data amount for two transmission rounds.

If the limited number of HARQ retransmission rounds is 2, data transmission may be performed three times for initial transmission and two retransmission rounds. In this case, the relay node 20 may perform quantization such that the quantized information amount is greater than the data amount for two transmission rounds and equal to or less than the data amount for three transmission rounds.

The relay node 20 performs the nested quantization as described above. A detailed description of the nested quantization method has been made above; thus it is omitted herein.

Next, the relay node 20 performs channel coding on part of the quantized data at step 902. Part of the quantized data is transmitted because the quantization is performed to generate data larger than the real data amount carried in the first R-D data packet. At this time, the part of the quantized data may be a predetermined number of MSBs. The channel coding may be performed at a coding rate determined according to the channel condition estimated between the relay node 20 and the destination node 30 as negotiated in advance.

Next, the relay node 20 transmits the coded data, i.e., first R-D data packet, to the destination node 30 at step 904 and waits for a response, i.e., an ACK/NACK, from the destination node 30.

If a response is received at step 906, the relay node determines at step 908 whether the response is ACK or NACK. If it is determined at step 908 that the ACK is received, the relay node 20 transmits the next packet to the destination node 30 at step 910. If there is no more data to be transmitted to the destination node 30, the relay node ends the procedure.

If it is determined at step 908 that a NACK is received, the relay node performs channel coding on the remaining part, i.e. LSBs, of the quantized data at step 912. The relay node 20 can perform channel coding on the LSBs, which are the part remaining, after transmitting at step 902 part of the quantized data acquired by quantizing at step 900 data to have redundant information.

Next, the relay node 20 may transmit the channel-coded data, e.g., second R-D data packet, to the destination node at step 914.

FIG. 10 is a flowchart illustrating an HARQ operation of a destination node in a relay wireless communication system using a CF scheme according to an embodiment of the present invention.

The destination node 30 may receive a first channel-coded packet, e.g. first R-D data packet, from the relay node 20 at step 1000. Then the destination node 30 performs decoding on the received packet at step 1002. Next, the destination node 30 determines whether the packet is decoded successfully at step 1004. If the estimated channel state and the real channel state between the relay node 20 and the destination node 30 are identical with each other and if the channel coding rate is appropriate for the channel state, the packet is likely to be decoded successfully. If it is determined at step 1004 that the packet is decoded successfully, the destination node 30 generates an ACK at step 1006 and transmits the ACK to the relay node to end the corresponding packet transmission or receive the next packet.

If the real channel state is worse than the estimated channel state or significant fading occurs because of abrupt channel variation, the packet decoding failure probability increases at the relay node 20. If it is determined at step 1004 that the packet decoding failed, the destination node 30 transmits a NACK to the relay node 20 at step 1008, which is unlike the CF scheme. In this way, it may be possible to request for HARQ retransmission from the relay node 20 to the destination node 30 rather than end-to-end data retransmission.

Next, the destination node 30 may receive the next channel-coded packet from the relay node 20 at step 1010. This means to receive residual information because the relay node 20 has quantized data to have redundant information as described above. Since the nested quantization is performed on the data, it may be possible to recover the data packet transmitted by the source node 10 more accurately by combining the first and second channel-coded packets and decoding the combined packet.

The destination node 30 combines the first and second channel-coded packets and performs decoding on the combined packet at step 1012. This is possible because the relay node 20 quantizes the data to have redundant information using the nested quantization technique as described above.

After decoding the combined packet at step 1012, the destination node 30 determines at step 1014 whether the decoding succeeds. If the decoding succeeds, the destination node 30 transmits an ACK to the relay node 20 at step 1006. Otherwise, if the decoding fails, the procedure goes to step 1008. Typically, the number of HARQ retransmission rounds may be limited to 1 or 2. Accordingly, if the decoding fails, the destination node may check, before transmitting the NACK, whether the number of retransmission rounds has reached the limit.

If the decoding fails even after the number of HARQ retransmission rounds has reached the limit, the destination node 30 may request for end-to-end retransmission. In this case, the destination node 30 may request for the end-to-end retransmission to the source node directly or via the relay node 20. However, the present invention is not limited thereby.

Although various embodiments of the present disclosure have been described using specific terms, the specification and drawings are to be regarded in an illustrative rather than a restrictive sense in order to help understand the present invention. Thus the scope of the invention should be determined by the appended claims and their legal equivalents rather than the specification, and various alterations and modifications within the definition and scope of the claims are included in the claims.

INDUSTRIAL APPLICABILITY

The present invention is applicable to wireless communication systems using relays.

The invention claimed is:

1. A hybrid automatic repeat request retransmission method of a relay node in a wireless communication system using a compress-and-forward (CF) scheme, the method comprising:

quantizing, when data is received from a previous node, the data into quantized information including redundant information using a nested quantization technique before being transmitted to a next node;

transmitting a most significant part of the quantized information to the next node through a preconfigured channel, the most significant part being channel-coded to have an amount suitable for the channel; and transmitting, when a negative acknowledgement (NACK) is received from the next node, a next significant part of the quantized information to the next node, the next significant part being channel coded to have the amount suitable for the channel.

2. The method of claim 1, wherein the previous node is a source node using the CF scheme.

3. The method of claim 1, wherein the next node is a destination node.

4. The method of claim 1, wherein the redundant information is generated as much as an amount being determined based on a limited number of hybrid automatic repeat request retransmission rounds.

5. A relay node device for performing hybrid automatic repeat request in a wireless communication system using a compress-and-forward (CF) scheme, the device comprising:

a receiver configured to: convert data received from a previous node to a baseband analog signal, receive an acknowledgement (ACK/NACK) from a next node, and transfer the acknowledgement to a controller;

a quantization unit which signal processing circuity configured to quantize, using nested quantization, the baseband analog signal into quantized information including redundant information for transmission to the next node;

a storage configured to store the quantized information;

a the controller configured to control to output the quantized information stored in the storage as much as an amount suitable for a preconfigured channel, transmit a most significant part of the quantized information for initial transmission, and retransmit a non-transmitted part of the quantized information, wherein the signal processing circuity is further configured to perform channel coding on data output from the storage; and a transmitter configured to transmit data channel-coded by the signal processing circuity through the preconfigured channel.

6. The device of claim 5, wherein the previous node is a source node.

7. The device of claim 5, wherein the next node is a destination node.

8. The device of claim 5, wherein the redundant information is generated as much as an amount being determined based on a limited number of hybrid automatic repeat request retransmission rounds.

* * * * *